United States Patent [19]

Mueller-Tamm et al.

[11] 3,817,969
[45] June 18, 1974

[54] MANUFACTURE OF PARTICULATE POLYETHYLENE

[75] Inventors: Heinz Mueller-Tamm, Ludwigshafen; Hans Frielingsdorf, Bad Duerkheim; Johann Nickl, Bad Duerkheim; Erich Kolk, Bad Duerkheim, all of Germany

[73] Assignee: Badishe Anilin & Soda-Fabrik Aktiengesellschaft, Ludwigshafen/Rhein, Germany

[22] Filed: May 8, 1972

[21] Appl. No.: 251,341

[30] Foreign Application Priority Data
May 18, 1971 Germany.............................. 2124591

[52] U.S. Cl... 260/94.9 DA, 252/429 C, 260/94.9 C
[51] Int. Cl.............................. C08f 1/56, C08f 3/06
[58] Field of Search................ 260/94.9 C, 94.9 DA

[56] References Cited
UNITED STATES PATENTS

| | | | |
|---|---|---|---|
| 2,967,834 | 1/1961 | Daniel et al.................... | 260/94.9 C |
| 3,676,415 | 7/1972 | Diedrich et al............. | 260/94.9 DA |
| 3,705,886 | 12/1972 | Kashiwa et al.............. | 260/94.9 DA |

Primary Examiner—Joseph L. Schofer

[57] ABSTRACT

Manufacture of particulate polyethylene by polymerizing ethylene in an agitated bed of dry particulate polyethylene by means of a catalyst system comprising (1) a particulate inorganic carrier and (2) a Ziegler catalyst applied to said carrier. The catalyst system is used in the form of an intimate mixture of the catalyst system with a particulate ethylene polymer having a softening point above the polymerization temperature used, the particles in said mixture being coated with an inert organic material which is solid at 30°C but liquid at the polymerization temperature used. This process makes it possible to obtain particulate polyethylene having a desirable particle size distribution.

7 Claims, No Drawings

MANUFACTURE OF PARTICULATE POLYETHYLENE

The present invention relates to a process for the manufacture of particulate polyethylene having a particle size of from 0.1 to 6.0 mm by polymerizing ethylene at temperatures of from 50° to 130°C and pressures of from 10 to 200 atmospheres in an agitated bed of dry particulate polyethylene having a particle diameter of from 0.1 to 6.0 mm by means of a catalyst system (CS) of 1. an inorganic carrier having a particle diameter of from 0.0001 to 2 mm and containing chemically combined metals and 2. a Ziegler catalyst applied to said carrier and consisting of (2.1) a catalyst component selected from the group consisting of chlorides, oxychlorides and alkoxychlorides of titanium, zirconium and vanadium and (2.2) a catalyst component selected from the group consisting of saturated metal alkyls, saturated metal alkoxyalkyls and saturated metal alkyl halides of the metals aluminum, magnesium and zinc and lithium alkyl, provided that the ratio of the carrier (1) to catalyst component (2.1) (based on the transition metal therein) is in the range 100:0.1 to 100:10, by weight, and the atomic ratio of the transition metal in catalyst component (2.1) to the metal in catalyst component (2.2) is in the range 100:1 to 100:10,000.

Prior art processes of this type show certain advantages over other processes of comparable nature, but they suffer from the drawback that the resulting particulate polyethylene includes a relatively large fraction of particles having diameters of less than 0.5 mm. This is undesirable for two reasons, firstly, this considerably hampers agitation of the bed thus making it difficult to achieve thorough mixing of the reaction mixture, and secondly, transportation difficulties arise when the polyethylene is worked up (unsatisfactory ingress into the machines).

It is an object of the invention to provide a process of the type defined above which shows the above drawback either not at all or to a considerably lesser extent.

We have found that this object is achieved by operating said process with a catalyst system (CS) in the form of a mixture (M) of the catalyst system (CS) and a specific particulate ethylene polymer (EP), the particles in said mixture (M) being coated with a material selected from a specific class of materials (CM), in a specific manner.

Some further advantageous embodiments of the process have also been found, and these will be dealt with below.

Accordingly, the present invention essentially relates to a process for the manufacture of particulate polyethylene having a particle diameter of from 0.1 to 6.0 mm by polymerizing ethylene at temperatures of from 50° to 130°C and pressures of from 10 to 200 atmospheres in an agitated bed of dry particulate polyethylene having a particle diameter of from 0.1 to 6.0 mm by means of a catalyst system (CS) consisting of 1. a particulate, inorganic carrier containing chemically combined metals and having a particle diameter of from 0.0001 to 2 mm and preferably from 0.0001 to 1 mm and 2. a Ziegler catalyst applied to said carrier and consisting of (2.1) a catalyst component selected from chlorides, oxychlorides and alkoxychlorides (particularly $C_{1-12}$ alkoxychlorides) of titanium, zirconium and vanadium and (2.2) a catalyst component selected from saturated metal alkyls (particularly metal $C_{1-12}$ alkyls), saturated metal alkoxyalkyls (particularly metal $C_{1-12}$ alkoxy $C_{1-12}$ alkyls) and saturated metal alkylhalides (particularly metal $C_{1-12}$ alkylchlorides) of the metals aluminum, magnesium and zinc and lithiumalkyls (particularly lithium $C_{1-12}$ alkyls), provided that the ratio of carrier (1) to catalyst component (2.1), based on the transition metal therein, is in the range 100:0.1 to 100:10 and preferably 100:0.3 to 100:5, by weight, and the atomic ratio of the transition metal in catalyst component (2.1) to the metal in catalyst component (2.2) is in the range 100:1 to 100:10,000, preferably 100:10 to 100:6,000. The process of the invention is characterized in that the catalyst system (CS) is used in the form of an intimate mixture (M) of the catalyst system (CS) and a particulate ethylene polymer (EP) having a particle diameter of from 0.1 to 6.0 mm and preferably from 0.1 to 1.0 mm and having a softening point above the polymerization temperature used, the particles of said mixture (M) being coated with an organic material (CM) which shows no ionic bonds, is inert to the catalyst system (CS) and is solid at 30°C but liquid at the polymerization temperature used, the coating being such that the following ratios by weight hold:

(CS) to (EP) 1:10 to 1:1,000 and preferably 1:25 to 1:50, (CS) to (CM) 1:0.01 to 1:1,000 and preferably 1:2.5 to 1:10, (EP) to (CM) 1:0.001 to 1:1 and preferably 1:0.1 to 1:0.3.

The process of the invention, apart from its special feature, may be carried out by conventional procedures and with conventional equipment, and consequently, detailed explanation thereof is unnecessary in this specification, although it may be mentioned that the process is equally suitable for continuous and batchwise polymerizations.

The following remarks on the catalyst system (CS) are pertinent: (I) Suitable carriers (1) are those normally used in the art. Suitable types are described, for example, in German Printed applications Nos. 1,909,984 and 1,924,648 and the published documents of Belgian Pat. No. 705,220.

It has been found that a particularly suitable carrier is one which has been obtained by heating a material of the following general formula for from 1 to 100 hours and preferably from 2 to 50 hours at a temperature of from 150° to 600°C and preferably from 250° to 400°C:

where
$Me^{II}$ stands for a metal or transition metal in the divalent state,
$Me^{III}$ stands for a metal of transition metal in the trivalent state,
$m$ stands for an integer of from 1 to 10 and preferably from 2 to 8 and in particular 6, n stands for an integer of from 2 to 5 and preferably from 2 to 4 and in particular 2, o stands for an integer of from 2 to 24 and preferably from 8 to 18 and in particular 16, p stands for an integer of from 1 to 3 and preferably 1 or 2 and in particular 1, q stands for an integer of from 0 to 10 and preferably from 2 to 6 and in particular 4, provided that $2m + 3n = o + 2p =$ an integer of from 8 to 26 and preferably from 16 to 26 and in particular 18.

A carrier of this kind is obtained when a material of the above general formula is heated for the time stated at the temperature specified. This may be effected for example by simply heating the said material in an oven of the kind normally used for drying inorganic compounds containing water of crystallization. The desired particle size may be obtained in a simple manner, for example by milling. Metals or transition metals ($Me^{II}$) suitable for the present purpose and present in the divalent state are, for example, beryllium, magnesium, calcium, strontium, barium, manganese, iron, cobalt, nickel, palladium, platinum, copper, zinc, cadmium and mercury. Of these, particularly suitable metals are magnesium, manganese, cobalt, nickel, copper, zinc and cadmium. Preferred metals of this group are magnesium, mangenese, cobalt, nickel, copper and zinc. The metals or transition metals ($Me^{II}$) may be present singly or as mixtures of two or more such metals. Metals or transition metals ($Me^{III}$) which are suitable for the present purpose and are present in the trivalent state are, for example, chromium, molybdenum, tungsten, iron, ruthenium, osmium, rhenium, iridium, aluminum and gallium. Of these, particularly suitable metals are chromium, molybdenum, tungsten, iron and aluminum. Preferred metals of this group are chromium and aluminum. These metals or transition metals ($Me^{III}$) may be present singly or as mixtures of two or more of such metals. The materials having the said general formula are readily obtainable. A well-tried method of manufacturing such materials is for example as follows: The said metals or transition metals are used in the form of watersoluble salts, such as the chlorides, sulfates or, preferably, nitrates, and are dissolved together in water in proportions giving the desired composition of the material and obeying the stoichiometry of the general formula given above. The resulting salt solution should contain a total of about 0.5 to 5 and preferably 1 to 4 moles of metal or transition metal ions per liter. It is heated to a temperature of from 50° to 100°C and preferably from 60° to 90°C and combined, over a period of from 0.5 to 120 minutes and preferably from 1 to 60 minutes, with an equivalent amount or, preferably, a slight excess of a 1M to 5M and preferably 1.5M to 4M aqueous solution of an alkali metal carbonate, in particular sodium bicarbonate, held at a temperature of from 50° to 100°C and preferably from 60° to 90°C. We prefer to operate using an excess of alkali metal bicarbonate equal to up to 20 percent and preferably from 0.5 to 3 percent by weight over the theoretical amount of bicarbonate. When the addition of alkali metal bicarbonate solution is complete, the mixture is stirred for from about 10 to 30 minutes and preferably from 15 to 20 minutes, after which the resulting precipitate is filtered off, washed with water and sucked free of excess water. In this manner, the materials of the type in question are obtained in approximately quantitative yields.

II. The active portion of catalyst (2) and catalyst components (2.1) and (2.2) may be referred to as conventional materials.

2.1. Suitable catalyst components of this kind are, for example: $TiCl_4$, $ZrCl_4$, $VCl_4$, $VOCl_3$, $TiCl_3(OC_4H_9)$ and $TiCl_2(OC_2H_5)_2$. Of these, particularly suitable components are $TiCl_4$, $VCl_4$ and $VOCl_3$, of which $TiCl_4$ is particularly preferred. The catalyst components (2.1) may be present singly or as mixtures of two or more of such components.

2.2. Suitable catalyst components of this kind are, for example: $Mg(C_4H_9)_2$, $Al(C_2H_5)_3$, $Al(C_3H_7)_3$, $Al(C_4H_9)_3$, $Al(C_8H_{17})_3$, $Al(C_{12}H_{25})_3$, $Al(C_2H_5)_2Cl$, $Al(C_2H_5)_2(OC_2H_5)$ and $Zn(C_2H_5)_2$. Of these, particularly suitable components are $Al(C_2H_5)_3$, $Al(C_3H_7)_3$, $Al(C_4H_9)_3$, $Al(C_8H_{17})_3$, $Al(C_{12}H_{25})_3$, $Al(C_2H_5)_2Cl$ and $Zn(C_2H_5)_2$, of which the aluminum compounds are particularly preferred. The catalyst components (2.2) may be present singly or as mixtures of two or more individual components.

Application of the catalyst (2) to the carrier (1) may be carried out in conventional manner. For example, one method comprises contacting the carrier with the catalyst component (2.1) and then with the catalyst component (2.2). More specifically, this may be carried out by leaving the carrier for a number of hours in boiling catalyst component (2.1) or a boiling solution of said catalyst component, at atmospheric pressure and room temperature, and then washing it well with an inert solvent followed by drying, for example in vacuo. The resulting precatalyst may then be combined with the catalyst component (2.2) which may be in solution for example. Alternatively, the catalyst component (2.2) may be applied first to the carrier (1), followed by catalyst component (2.1). In special cases, it is even possible to apply both catalyst components (2.1) and (2.2) to the carrier simultaneously.

The above catalyst system (CS) is used, according to the invention, in the form of a mixture (M) of the catalyst system (CS) and a specific particulate ethylene polymer (EP), the particles of the mixture (M) being coated with a material selected from a specific class of materials (CM) in a specific manner. Suitable ethylene polymers for this purpose are conveniently, but not necessarily, of the same type as the polyethylene formed by the process. Coating materials (CM) of the desired properties are, in particular, waxy substances containing oxygen combined in ether-like and/or ester-like manner, such as polyvinyl ether waxes and ester waxes, and also silicone waxes (where there is doubt as to whether said substance is inert to the catalyst system, this may be readily ascertained by simple experiment). The said coating material (CM) may be coated onto the particles of the mixture of catalyst system and ethylene polymer in a simple manner, for example by heating the required amount of coating material (CM) in a mixer to just above its melting point, adding the mixture and stirring until the coating material (CM) has been virtually homogeneously taken up and then cooling. It is equally possible to stir a mixture of all three components and heat it to above the melting point of the coating material and then continue in the above manner.

It should be noted that usual precautions should be taken when working with catalyst components (2.1) and (2.2), catalyst (2) and the catalyst system (CS) on account of the sensitivity of these materials. That is to say, these materials should be handled with the exclusion of water (moisture) and oxygen (air).

During the development of the present invention, it was found to be desirable to use the ethylene to be polymerized in admixture with hydrogen in proportions of up to 150 parts by volume of hydrogen for every 100 parts by volume of said ethylene. This measure is conveniently employed when it is desired to obtain a polyethylene containing a minimum of particles having a diameter of more than 4 mm (tails). This effect of the hydrogen increases with its concentration and with the polymerization temperature.

EXAMPLE 1

300 g of a material having the formula:

$$(Mg^{II})_6 \cdot (Al^{III})_2 \cdot (OH)_{16} \cdot (CO_3)_1 \cdot (H_2O)_4$$

are distributed over an area of 400 cm² in a drying oven and held at a temperature of 290°C for 15 hours. This gives a carrier (1), which is milled to particles having diameters of from about 0.005 to 0.1 mm. In a conventional extractor, equipped with a flask, an extracting zone with fritted glass disk disposed above said flask, a stirrer within said extracting zone and a reflux condenser located above said extracting zone, 200 g of the carrier are charged into the zone normally used as extracting zone. 1.5 l of $TiCl_4$ are placed in the flask. The $TiCl_4$ is then brought to the boil and kept at the boil for 7 hours. The carrier is thus in contact with $TiCl_4$ vapor over this period. The $TiCl_4$-laden carrier is then washed with n-heptane and dried at room temperature in vacuo. There is thus obtained a precatalyst in which the ratio of carrier to TiCl (based on Ti) is approximately 100:0.63, by weight. 1,080 parts by weight of this precatalyst are then homogeneously mixed with 560 parts by weight of $Al(C_2H_5)_3$ in a stirred vessel at room temperature. This gives the final catalyst system (CS), in which the atomic ratio of Ti to Al is approximately 100:10,000.

A heated mixer having a capacity of 8 liters is filled with 40 g of the catalyst system (CS), 850 g of a particulate polyethylene having a particle diameter of from 0.5 to 1 mm (softening range 125° to 136°C) and 100 g of pure polyvinylalkyl ether wax (melting point 50°C). With constant stirring, the mixture is heated over 30 minutes to 80°C and held at that temperature for 5 minutes before cooling to room temperature.

The polymerization itself is carried out continuously in a stirred reactor having a capacity of 200 liters and containing, under steady-state conditions, a bed of 35 kg of dry particulate polyethylene having a particle diameter of from 0.1 to 6 mm. In the reactor, the ethylene pressure is kept constant at 35 atmospheres gage and the temperature is maintained at 109°C. The said wax-coated mixture is fed to the reactor at a rate of 0.25 g/hr. This procedure gives 3 kg/hr of a particulate polyethylene having a particle diameter of from 0.1 to 6 mm. The particle size distribution of the polyethylene is given in Table 1 below.

COMPARATIVE TEST

Example 1 is repeated except that no polyvinylalkyl ether wax is used. The particle size distribution of the polyethylene thus obtained is also given in Table 1 below.

TABLE 1

| Sieve fraction | Example 1 % w/w | Comparative test % w/w |
|---|---|---|
| 6 to 5 mm | 40.9 | 0.9 |
| 5 to 4 mm | 16.9 | 2.4 |
| 4 to 3 mm | 14.2 | 3.2 |
| 3 to 2 mm | 13.5 | 5.8 |
| 2 to 1 mm | 8.0 | 9.2 |
| 1 to 0.75 mm | 3.0 | 10.6 |
| 0.75 to 0.5 mm | 2.0 | 16.5 |
| 0.5 to 0.4 mm | 0.7 | 13.1 |
| 0.4 to 0.3 mm | 0.6 | 26.5 |
| 0.3 to 0.2 mm | 0.2 | 21.8 |
| 0.2 to 0.1 mm | — | 21.8 |
| below 0.1 mm | — | 21.8 |

EXAMPLES 2 to 4

Example 1 is repeated in each case except that different mixtures of ethylene and hydrogen are used (see Table 2 below), the total pressure being maintained at 35 atmospheres gage in each case, and that polymerization is carried out at a temperature of 110°C and the wax-coated mixture is fed to the reactor at a rate of 22 g/hr. The results are given in Table 2 below.

TABLE 2

| Ex. No. | Parts of $H_2$ per 100 parts of ethylene by volume | Sieve fraction above 4 mm (% w/w) |
|---|---|---|
| 2 | 4.2 | 67.6 |
| 3 | 7.5 | 35.8 |
| 4 | 22.0 | 8.9 |

EXAMPLES 5 and 6

Example 1 is repeated in each case except that a mixture of ethylene and hydrogen (100:25 by volume) is used, the total pressure being maintained at 35 atmospheres gage, and that different temperatures are employed during polymerization (see Table III below) and the wax-coated mixture is fed to the reactor at a rate of 40 g/hr. The results are given in Table III below.

TABLE III

| Ex. No. | Polymerization temperature (°C) | Sieve fraction above 4 mm (% w/w) |
|---|---|---|
| 5 | 110 | 8.6 |
| 6 | 90 | 33.8 |

We claim:

1. A process for the manufacture of particulate polyethylene having a particle diameter of from 0.1 to 6.0 mm by polymerizing ethylene at temperatures of from 50° to 130°C and pressures of from 10 to 200 atmospheres in an agitated bed of dry particulate polyethylene having a particle diameter of from 0.1 to 6.0 mm by means of a catalyst system (CS) consisting of
   1. a particulate, inorganic carrier containing chemically combined metals and having a particle diameter of from 0.001 to 2 mm and
   2. a Ziegler catalyst applied to said carrier and consisting of 2.1. a catalyst component selected from chlorides, oxychlorides and alkoxychlorides of titanium, zirconium and vanadium and 2.2. a catalyst component selected from saturated metal alkyls, saturated metal alkoxyalkyls and saturated metal alkylhalides of the metals aluminum, magnesium and zinc and lithiumalkyls provided that the ratio of carrier (1) to catalyst component (2.1), based on the transition metal therein, is in the range 100:0.1 to 100:10, by weight, and the atomic ratio of the transition metal in catalyst (2.1) to the metal in catalyst component (2.2) is in the range 100:1 to 100:10,000, wherein the catalyst system (CS) is used in the form of an intimate mixture (M) of the catalyst system (CS) and a particulate ethylene polymer (EP) having a particle size of from 0.1 to 6.0 mm and having a softening point above the polymerization temperature used, the particles of said mixture (M) being coated with an organic material selected from the group consisting of a polyvinyl ether wax, an ester wax and a silicone wax (CM) which shows no ionic bonds, is inert to the catalyst system (CS) and is solid at 30°C but liquid at the polymerization temperature used, the said coating being such that the following ratios by weight hold:

(CS) to (EP) 1:10 to 1:1,000

(CS) to (CM) 1:0.01 to 1:1,000

(EP) to (CM) 1:0.001 to 1:1.

2. A process as claimed in claim 1, wherein the catalyst system used is one in which carrier (1) is a material which has been obtained by heating a material of the general formula

for from 1 to 100 hours at a temperature of from 150° to 600°C, in which formula $Me^{II}$ stands for a metal or transition metal in the divalent state, $Me^{III}$ stands for a metal or transition metal in the trivalent state, $m$ stands for an integer of from 1 to 10, $n$ stands for an integer of from 2 to 5, $o$ stands for an integer of from 2 to 24, $p$ stands for an integer of from 1 to 3, $q$ stands for an integer of from 0 to 10, provided that $2m + 3n = o + 2p =$ an integer of from 8 to 26.

3. A process as claimed in claim 2, wherein the ethylene to be polymerized is used in admixture with hydrogen so that up to 150 parts by volume of hydrogen are present for every 100 parts by volume of said ethylene.

4. A process as claimed in claim 3 wherein said ratios by weight are:

(CS) to (EP) 1:25 to 1:50

(CS) to (CM) 1:2.5 to 1:10

(EP) to (CM) 1:0.1 to 1:0.3.

5. A process as claimed in claim 1, wherein the ethylene to be polymerized is used in admixture with hydrogen so that up to 150 parts by volume of hydrogen are present for every 100 parts by volume of said ethylene.

6. A process as claimed in claim 1 wherein said coating material (CM) is a polyvinyl alkyl ether wax.

7. A process as claimed in claim 1 wherein said ratios by weight are:

(CS) to (EP) 1:25 to 1:50

(CS) to (CM) 1:2.5 to 1:10

(EP) to (CM) 1:0.1 to 1:0.3.

* * * * *